United States Patent
Ochi

(10) Patent No.: US 9,809,059 B2
(45) Date of Patent: Nov. 7, 2017

(54) PNEUMATIC TIRE

(71) Applicant: BRIDGESTONE CORPORATION, Tokyo (JP)

(72) Inventor: Naoya Ochi, Higashimurayama (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 14/426,638

(22) PCT Filed: Sep. 9, 2013

(86) PCT No.: PCT/JP2013/005335
§ 371 (c)(1),
(2) Date: Mar. 6, 2015

(87) PCT Pub. No.: WO2014/054225
PCT Pub. Date: Apr. 10, 2014

(65) Prior Publication Data
US 2015/0224826 A1    Aug. 13, 2015

(30) Foreign Application Priority Data
Oct. 5, 2012 (JP) .................... 2012-222678

(51) Int. Cl.
*B60C 11/01*     (2006.01)
*B60C 11/04*     (2006.01)
(Continued)

(52) U.S. Cl.
CPC ............... *B60C 11/01* (2013.01); *B60C 5/00* (2013.01); *B60C 11/04* (2013.01); *B60C 11/11* (2013.01);
(Continued)

(58) Field of Classification Search
CPC ......... B60C 11/01; B60C 11/04; B60C 11/11; B60C 2011/013; B60C 2011/1213;
(Continued)

(56) References Cited

U.S. PATENT DOCUMENTS 5,571,351 A * 11/1996 Hatakenaka ............ B60C 11/01
152/209.16

FOREIGN PATENT DOCUMENTS

| CN | 101835635 A | 9/2010 |
| CN | 102131658 A | 7/2011 |

(Continued)

OTHER PUBLICATIONS

International Search Report for PCT/JP2013/005335 dated Dec. 10, 2013.

*Primary Examiner* — Michael H Wilson
*Assistant Examiner* — Philip N Schwartz
(74) *Attorney, Agent, or Firm* — Sughrue Mion, PLLC

(57) ABSTRACT

The present invention provides a pneumatic tire capable of exhibiting improved on-snow cornering performance on a snowy road and improved on-ice cornering performance on an icy road surface. Specifically, the pneumatic tire comprises: a tread portion (1) including a ground contact surface (5) to be brought into contact with a road surface when the tire is rotated; a pair of sidewall portions (3) forming side surfaces of the tire and extending from the tread portion (1) toward the inner side in the tire radial direction, respectively; and buttress portions each forming an outer surface region (7) ranging from an end portion in the width direction of the ground contact surface (5) to the corresponding sidewall portion (3), wherein polygonal blocks (11) are formed in the outer surface region (7) by demarcation by grooves (9).

17 Claims, 3 Drawing Sheets

(51) Int. Cl.
  *B60C 11/11* (2006.01)
  *B60C 5/00* (2006.01)
  *B60C 11/12* (2006.01)

(52) U.S. Cl.
  CPC . *B60C 2011/013* (2013.01); *B60C 2011/1213* (2013.01)

(58) Field of Classification Search
  CPC ....... B60C 13/00; B60C 13/002; B60C 13/02; B60C 5/00
  USPC ........................................................ D12/605
  See application file for complete search history.

(56) References Cited

FOREIGN PATENT DOCUMENTS

| | | | |
|---|---|---|---|
| EP | 2088007 | A1 | 8/2009 |
| EP | 2202098 | A1 * | 6/2010 ......... B60C 11/0306 |
| JP | 506682 | A | 1/1975 |
| JP | 62-168703 | A | 7/1987 |
| JP | 63312206 | A | 12/1988 |
| JP | 7-285302 | A | 10/1995 |
| JP | 2000-313206 | A | 11/2000 |
| JP | 2001-163010 | A | 6/2001 |
| JP | 2001219711 | A | 8/2001 |
| JP | 2002-274126 | A | 9/2002 |
| JP | 2003-211915 | A | 7/2003 |
| JP | 2006-182179 | A | 7/2006 |
| JP | 2009039961 | A | 2/2009 |
| JP | 2009-73313 | A | 4/2009 |
| JP | 2010-111267 | A | 5/2010 |
| JP | 2010264962 | A | 11/2010 |
| JP | 2012-232684 | A | 11/2012 |
| RU | 3725 | U1 | 3/1997 |
| RU | 2283241 | C1 | 9/2006 |
| WO | 2011162748 | A1 | 12/2011 |

* cited by examiner

PNEUMATIC TIRE

CROSS REFERENCE TO RELATED APPLICATIONS

This application is a National Stage of International Application No. PCT/JP2013/005335 filed Sep. 9, 2013, claiming priority based on Japanese Patent Application No. 2012-222678 filed Oct. 5, 2012, the contents of all of which are incorporated herein by reference in their entirety.

TECHNICAL FIELD

The present invention relates to a pneumatic tire.

BACKGROUND ART

A pneumatic tire for use on an icy/snowy road surface is often buried in snow up to buttress portions thereof each situated between a tread end and a sidewall portion when the tire runs on a road covered by deep snow. The tire is required to exhibit desired running performances such as traction performance even in such a state as described above. In view of this, the conventional pneumatic tire for use on an icy/snowy road surface is provided with buttress portions having configurations as shown in PTL 1, for example.

CITATION LIST

Patent Literature

PTL 1: JP2003-211915 Laid-Open

SUMMARY OF THE INVENTION

Technical Problems

However, such a pneumatic tire as disclosed in PTL 1 still has room for improvement in terms of running performance in stepping over a rut formed in a snowy road surface and running performance in a cornering situation on an icy road surface. An object of the present invention is therefore to provide a pneumatic tire capable of exhibiting improved performance in stepping over a rut on a snowy road (i.e. improved on-snow cornering performance) and improved on-ice cornering performance on an icy road surface.

Solution to the Problems

The present invention has been contrived to solve the aforementioned problems of the prior art and provides a pneumatic tire, comprising: a tread portion including a ground contact surface to be brought into contact with a road surface when the tire is rotated; a pair of sidewall portions forming side surfaces of the tire and extending from the tread portion toward the inner side in the tire radial direction, respectively; and buttress portions each forming an outer surface region ranging from an end portion in the width direction of the ground contact surface to the corresponding sidewall portion, wherein polygonal blocks are formed in the outer surface region by demarcation by grooves.

In the tire of the present invention, an "end portion in the width direction of the ground contact surface" of the tread portion represents the outermost position in the tire width direction of a tire surface to be brought into contact with the ground (i.e. a ground contact surface of the tread portion) in a state where the tire has been assembled with a normal rim and inflated at the normal internal pressure with normal load exerted thereon. A "normal rim" represents a standard rim prescribed in the standards described below in accordance with tire sizes. The "normal internal pressure" represents air pressure corresponding the maximum loading capacity of a single wheel having an application size prescribed in the standards below. The "normal load" represents the allowed maximum load (the maximum loading capacity) of a single wheel having the application size prescribed in the standards. The standards each represent an industrial standard which is valid in a region where a tire is manufactured or used and examples thereof include "JATMA YEAR BOOK" of Japan Automobile Tyre Manufacturers Association in Japan, "YEAR BOOK" of the Tire and Rim Association Inc. in the United States, and "STANDARDS MANUAL" of the European Tyre and Rim Technical Organisation in Europe.

Advantageous Effect of the Invention

According to the present invention, it is possible to provide a pneumatic tire capable of exhibiting improved on-snow cornering performance on a snowy road and improved on-ice cornering performance on an icy road surface.

DESCRIPTION OF THE EMBODIMENTS

An embodiment of the present invention will be demonstratively described hereinafter with reference to the drawings.

Figure 1:
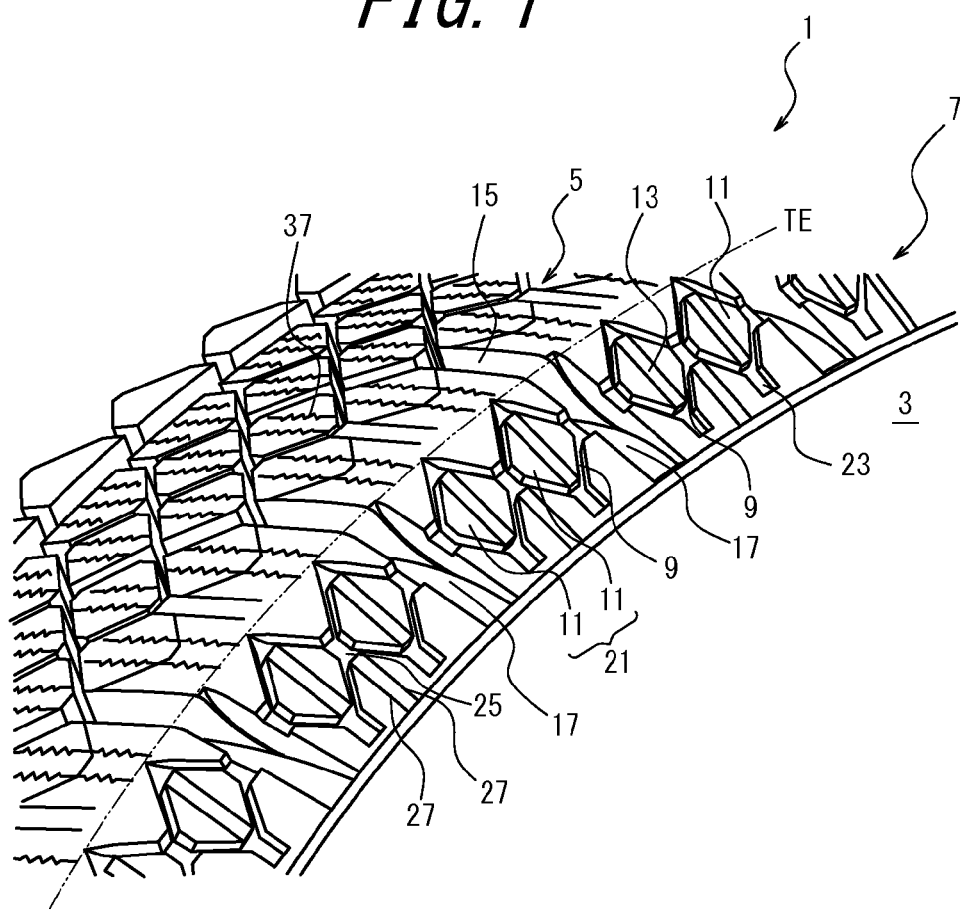
FIG. 1 is a partial perspective view showing a pneumatic tire according to one embodiment of the present invention.

FIG. 1 shows a pneumatic tire of the present embodiment (which pneumatic tire will be referred to simply as "tire" hereinafter). In FIG. 1, reference number 1 represents a tread portion of the tire, 3 represents each sidewall portion of a pair of sidewall portions extending from respective sides of the tread portion 1 toward the inner side in the tire radial direction, 5 represents a ground contact surface formed in the tread portion 1, and 7 represents each outer surface region formed in a buttress portion of the tire.

Polygonal blocks 11 are formed in the outer surface region 7 ranging from a tread end TE as an end portion in the width direction of the ground contact surface 5 to the corresponding sidewall portion 3 by demarcation by grooves 9 provided in a polygonal configuration (a rhombic configuration in an example shown in FIG. 1) in the outer surface region 7 in the present embodiment. The configuration in which the grooves 9 are provided is not limited to a rhombus and may be a pentagon, a hexagon or the like.

The polygonal blocks 11 are disposed in the tire circumferential direction in the outer surface region 7 in the example shown in FIG. 1. The grooves 9 are provided in a rhombic configuration in the example such that four sides constituting a rhombus are slanted in both the tire circumferential direction and the tire width direction and that two diagonal lines of the rhombus extend in the tire circumferential direction and the tire width direction, respectively. In a case where the grooves 9 demarcating each polygonal block 11 are provided in a rhombic configuration as in the aforementioned example, a widthwise groove 13 as a first auxiliary groove is formed in an outer surface of the polygonal block 11 such that the widthwise groove 13 is aligned with one of the diagonal lines of a rhombus and extends in the tire width direction. Further, the outer surface region 7 is provided with a lateral groove 17 communicating with a lug groove 15 of the tread portion 1 and extending to be inclined with respect to the tire width direction, such that two polygonal blocks 11 are disposed between every two lateral grooves 17, which two polygonal blocks 11 constitute a block group 21. The widthwise groove 13 as the first auxiliary groove generally extending in the tire width direction may alternatively be inclined with respect to the tire width direction and/or may extend in a curved/zigzag manner instead of extending linearly.

Figure 2:
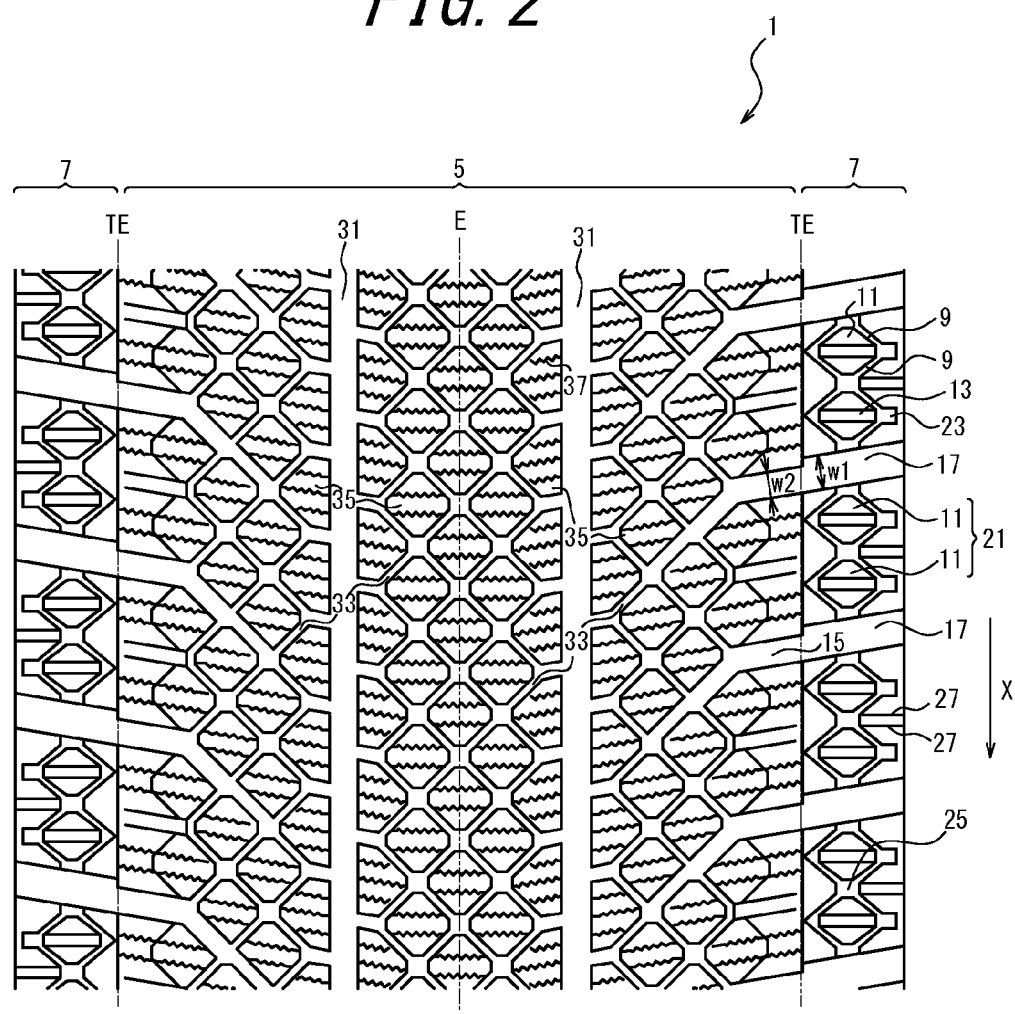
FIG. 2 is a developed view showing a part of a tread portion of the pneumatic tire of FIG. 1.

In FIG. 2, the respective outer surface regions 7 situated on respective sides of the tire equatorial plane E are displaced in the tire circumferential direction in an asymmetrical manner from an imaginary symmetrical configuration with respect to the tire equatorial plane E. The lateral groove 17 extend linearly from the inner side toward the outer side in the tire width direction so as to be inclined with respect to the tire width direction. A groove width w1 of the lateral groove 17 is larger than a groove width w2 of the lug groove 15 and also larger than groove widths of the groove 9 and the widthwise groove 13. A "groove width" represents an opening distance of a groove measured at an outer surface of the tire in a direction orthogonal to the extending direction of the groove in the present invention. The grooves 9 demarcating each polygonal block 11 have in the vicinity of the merged outer ends in the tire width direction thereof a rectangular enlarged groove portion 23 extending on the outer side in the tire width direction. Specifically, the enlarged groove portion 23 is located at a corner portion on the outer side in the tire width direction of a rhombus formed by the grooves 9 and has a wider groove width than the grooves 9. The grooves 9 in the same polygonal block group communicate with each other via a communication portion 25 having a large groove width. Two widthwise fine grooves 27 as second auxiliary grooves are formed between the two polygonal blocks 11 constituting each block group 21 and extend in the tire width direction in the example shown in the drawings. The widthwise fine grooves 27 are formed as sipes having small groove widths in the example shown in the drawings.

A plurality of land portions 35 are formed in the tread portion 1 by demarcation by two circumferential main grooves 31 linearly extending in the tire circumferential direction and lattice-like groves 33. The land portions 35 are disposed in a staggered manner such that they are displaced relative to each other in the tire circumferential direction. An outer surface of each land portion 35 is provided with a sipe 37 formed to extend in a zigzag manner in the tire width direction.

In a case where a vehicle mounted with the pneumatic tires according to the one embodiment of the present invention having the structures as described above runs on a snowy road surface, edges realized by the grooves 9 disposed in polygonal configurations and the polygonal blocks 11 demonstrate good edge effects in multiple directions when the outer surface regions of the tire are brought into contact with snow ruts formed in the snowy road surface, thereby making it easy for the tire to step over the snow ruts (i.e. improving the on-snow cornering performance of the tire). Further, in a case where shoulder portions of the tire are brought into contact with an icy road surface in a cornering situation on the icy road surface due to an influence of load shift and/or rough roads, the aforementioned edge effects are similarly demonstrated to improve the cornering performance of the tire on the icy road surface. In the present embodiment, the edge effects in multiple directions are facilitated and thus the on-snow cornering performance and the on-ice cornering performance of the tire are reliably improved because the grooves 9 are provided in a rhombic configuration such that the respective sides of a rhombus are slanted with respect to both the tire circumferential direction and the tire width direction. Further, edges realized by the widthwise grooves 13, the lateral grooves 17, the widthwise fine grooves 27 and the like also demonstrate similar good edge effects, thereby further improving the on-snow cornering performance and the on-ice cornering performance of the tire.

Yet further, an effect of draining water between a ground contact surface of the tread portion and a road surface toward the outer side in the tire width direction can be enhanced because the lateral groove 17 communicates with the lug groove 15 and extends to be inclined with respect to the tire width direction toward the outer side in the tire width direction. Yet further, making the groove with w1 of the lateral groove 17 larger than the groove width w2 of the lug groove 15 allows a groove ratio in the ground contact surface of the tread portion to be reduced, i.e. a ground contact area to be increased, thereby improving the on-ice performance of the tire. In this regard, an increased groove ratio in the outer surface region 7 of the tire well improves traction and braking performances of the tire on a snowy road surface.

Yet further, snow column shearing force, generated as a result of snow entering the widthwise grooves 13 and the enlarged groove portions 23 and rammed therein when the tire runs on a snowy road, significantly improves traction performance on a road covered with deep snow and thus escape performance when the tire is stuck in such deep snow, as well.

The present invention has been described based on the one embodiment exemplarily shown in the drawings. The present invention, however, is not limited to the embodiment described above and may be changed or modified in appropriate manner within the scope of the appended claims.

EXAMPLES

Figure 3:
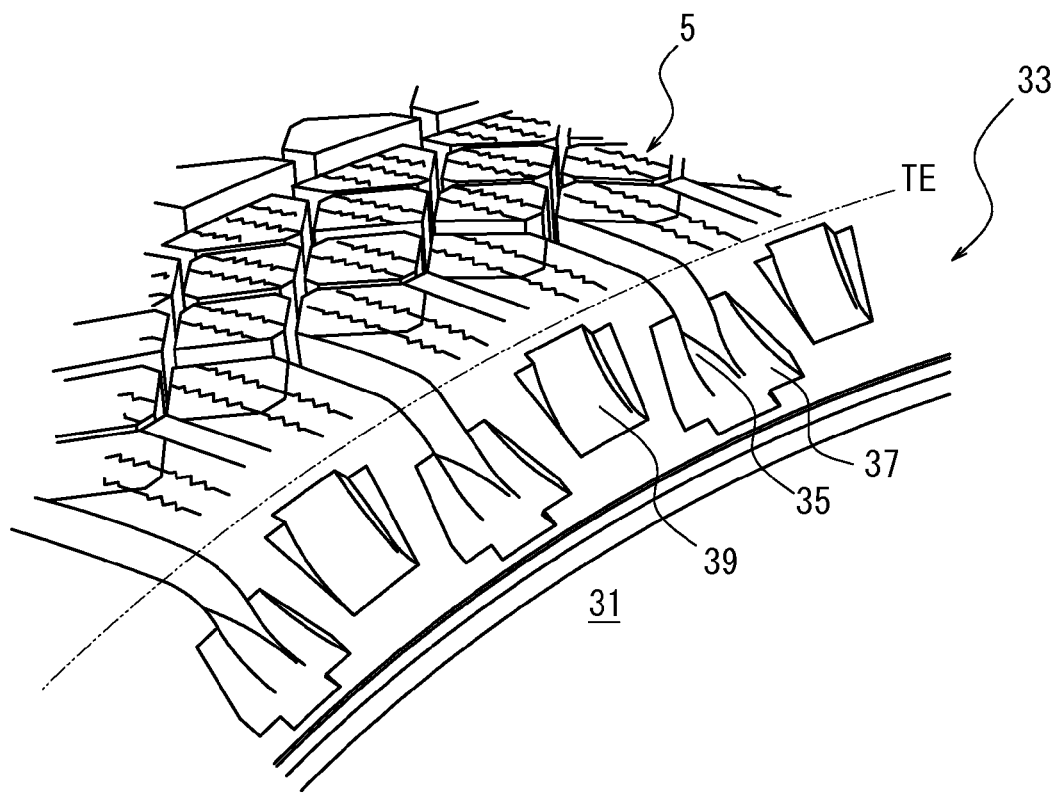
FIG. 3 is a partial perspective view showing a tire of Comparative Example.

Test tires according to the present invention (Example tires) and test tires according to the prior art (Comparative Example tires) were then prepared and on-ice performance and on-snow performance thereof were evaluated in various manners, as explained below. Example tire and Comparative Example tire were each prepared as a radial tire for a passenger vehicle having tire size: 195/65R15. Example tire according to the present invention had the structure as shown in FIG. 1 and FIG. 2. Comparative Example tire was basically the same as Example tire, except that outer surface regions 33 each ranging from tread end TE to a corresponding sidewall portion 31, of the former, are different from the outer surface regions 7 of the latter, as shown in FIG. 3. A first recessed portion 37 is formed at each open end portion of a lug groove 35 and a second recessed portion 39 is formed at the midpoint in the circumferential direction between every two first recessed portions 37 so as to open to the ground contact surface side in the outer surface region 33 of Comparative Example tire.

Various tire performances were evaluated by using the test tires described above. On-ice braking performance is indicated by an index of a measured value of a braking distance traveled, after full brake application, by a vehicle mounted with the relevant test tires and initially running at the speed of 20 km/hour on an ice layer-covered road surface of a test course. On-ice cornering performance is indicated by an index of an evaluation score of the comprehensive feeling tests regarding braking performance, startability, straight line vehicle stability, and adroit cornering on an ice layer-covered road surface of a test course. On-snow traction performance is indicated by an index of counted time taken by a vehicle mounted with the relevant test tires to accelerate from the initial speed of 10 km/hour to 45 km/hour on a road surface covered with compacted snow of a test course. On-snow cornering performance is indicated by an index of an evaluation score of the comprehensive feeling tests regarding braking performance, startability, straight line vehicle stability, and adroit cornering on a road surface covered with compacted snow of a test course. The evaluation results are shown in summarized manner in Table 1. These results are each expressed by an index value relative to the corresponding result of Comparative tire being "100". The larger index value represents the better on-ice/on-snow performance of the tire.

TABLE 1

|  | Example tire | Comparative Example tire |
|---|---|---|
| On-ice braking performance | 105 | 100 |
| On-ice cornering performance | 107 | 100 |
| On-snow traction performance | 103 | 100 |
| On-snow cornering performance | 105 | 100 |

It is understood from the test results shown in Table 1 that Example tire according to the present invention exhibits significantly better on-ice performance and on-snow performance than Comparative Example tire.

INDUSTRIAL APPLICABILITY

According to the present invention, it is possible to provide a pneumatic tire capable of exhibiting improved on-snow cornering performance on a snowy road and improved on-ice cornering performance on an icy road surface.

REFERENCE SIGNS LIST

1 Tread portion
3 Sidewall portion
5 Ground contact surface of tread portion
7 Outer surface region
9 Groove
11 Polygonal block
13 First auxiliary groove (Widthwise groove)
15 Lug groove
17 Lateral groove
23 Enlarged groove portion
27 Second auxiliary groove (Widthwise fine groove)

The invention claimed is:
1. A pneumatic tire, comprising:
a tread portion including a ground contact surface to be brought into contact with a road surface when the tire is rotated;
a pair of sidewall portions forming side surfaces of the tire and extending from the tread portion toward the inner side in the tire radial direction, respectively;
buttress portions each forming an outer surface region ranging from an end portion in the width direction of the ground contact surface to the corresponding sidewall portion;
a lateral groove formed in the buttress portion; and
a lug groove provided in the ground contact surface of the tread portion communicating with the lateral groove,
wherein polygonal blocks are formed in the outer surface region by demarcation grooves, and
wherein a groove width of the lateral groove is larger than a groove width of the lug groove,
wherein a first auxiliary groove extending in the tire width direction is formed in an outer surface of each polygonal block, the first auxiliary groove having a groove depth less than the demarcation groove.
2. The pneumatic tire of claim 1, wherein the lateral groove is formed in the buttress portion such that the polygonal blocks adjacent in the tire circumferential direction are disposed between every two lateral grooves.
3. The pneumatic tire of claim 1, wherein an enlarged groove portion is formed at the merged outer ends in the tire width direction of the grooves demarcating each polygonal block.
4. The pneumatic tire of claim 1, wherein demarcation grooves of one of the polygonal blocks merge with each other on an outer side of the polygonal block at a merge portion and an enlarged groove portion having a groove width greater than the demarcation grooves extends from the merge portion in the widthwise direction toward an outer side of the pneumatic tire.
5. A pneumatic tire, comprising:
a tread portion including a ground contact surface to be brought into contact with a road surface when the tire is rotated;
a pair of sidewall portions forming side surfaces of the tire and extending from the tread portion toward the inner side in the tire radial direction, respectively; and
buttress portions each forming an outer surface region ranging from an end portion in the width direction of the ground contact surface to the corresponding sidewall portion,
wherein polygonal blocks are formed in the outer surface region by demarcation grooves, and
wherein a first auxiliary groove extending in the tire width direction is formed in an outer surface of each polygonal block, the first auxiliary groove having a groove depth less than the demarcation groove.
6. The pneumatic tire of claim 5, wherein a lateral groove is formed in the buttress portion such that the polygonal blocks adjacent in the tire circumferential direction are disposed between every two lateral grooves and that the lateral groove communicates with a lug groove provided in the ground contact surface of the tread portion.
7. The pneumatic tire of claim 5, further comprising:
a lateral groove formed in the buttress portion; and
a lug groove provided in the ground contact surface of the tread portion communicating with the lateral groove, and
wherein a groove width of the lateral groove is larger than a groove width of the lug groove.
8. The pneumatic tire of claim 5, wherein an enlarged groove portion is formed at the merged outer ends in the tire width direction of the grooves demarcating each polygonal block.
9. The pneumatic tire of claim 5, wherein demarcation grooves of one of the polygonal blocks merge each other on an outer side of the polygonal block at a merge portion and an enlarged groove portion having a groove width greater than the demarcation grooves extends from the merge portion in the widthwise direction toward an outer side of the pneumatic tire.

10. The pneumatic tire of claim 5, wherein two fine grooves extend in the widthwise direction to a point outside of the polygonal blocks at a circumferential location between adjacent grooves.

11. A pneumatic tire, comprising:
a tread portion including a ground contact surface to be brought into contact with a road surface when the tire is rotated;
a pair of sidewall portions forming side surfaces of the tire and extending from the tread portion toward the inner side in the tire radial direction, respectively; and
buttress portions each forming an outer surface region ranging from an end portion in the width direction of the ground contact surface to the corresponding sidewall portion,
wherein polygonal blocks are formed in the outer surface region by demarcation grooves,
wherein demarcation grooves of one of the polygonal blocks communicate with demarcation grooves of an adjacent one of the polygonal blocks in the tire circumferential direction by a communication portion having a groove width larger than the demarcation grooves.

12. The pneumatic tire of claim 11, wherein a lateral groove is formed in the buttress portion such that the polygonal blocks adjacent in the tire circumferential direction are disposed between every two lateral grooves and that the lateral groove communicates with a lug groove provided in the ground contact surface of the tread portion.

13. The pneumatic tire of claim 11, wherein a first auxiliary groove extending in the tire width direction is formed in an outer surface of each polygonal block, the first auxiliary groove having a groove depth less than the demarcation groove.

14. The pneumatic tire of claim 11, further comprising:
a lateral groove formed in the buttress portion; and
a lug groove provided in the ground contact surface of the tread portion communicating with the lateral groove, and
wherein a groove width of the lateral groove is larger than a groove width of the lug groove, and
wherein a first auxiliary groove extending in the tire width direction is formed in an outer surface of each polygonal block.

15. The pneumatic tire of claim 11, wherein an enlarged groove portion is formed at the merged outer ends in the tire width direction of the grooves demarcating each polygonal block.

16. The pneumatic tire of claim 11, wherein two fine grooves extend in the widthwise direction to a point outside of the polygonal blocks at a circumferential location between adjacent grooves.

17. The pneumatic tire of claim 11, wherein demarcation grooves of one of the polygonal blocks merge with each other on an outer side of the polygonal block at a merge portion and an enlarged groove portion having a groove width greater than the demarcation grooves extends from the merge portion in the widthwise direction toward an outer side of the pneumatic tire.

* * * * *